United States Patent
O'Brien, III et al.

(10) Patent No.: US 9,286,226 B1
(45) Date of Patent: Mar. 15, 2016

(54) STORAGE PROCESSOR HARDWARE UPGRADE IN A STORAGE SYSTEM

(71) Applicant: EMC Corporation, Hopkinton, MA (US)

(72) Inventors: Walter A. O'Brien, III, Westborough, MA (US); David W. Harvey, Newton, MA (US); Jeffrey A. Brown, Shrewsbury, MA (US); Henry Austin Spang, IV, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 162 days.

(21) Appl. No.: 14/230,644

(22) Filed: Mar. 31, 2014

(51) Int. Cl.
  *G06F 12/00* (2006.01)
  *G06F 12/08* (2006.01)

(52) U.S. Cl.
  CPC ........ *G06F 12/0866* (2013.01); *G06F 12/0806* (2013.01)

(58) Field of Classification Search
  None
  See application file for complete search history.

(56) References Cited

U.S. PATENT DOCUMENTS

| | | | |
|---|---|---|---|
| 5,361,342 A * | 11/1994 | Tone | G06F 12/0822 711/121 |
| 5,379,391 A * | 1/1995 | Belsan | G06F 12/0815 711/113 |
| 6,823,336 B1 * | 11/2004 | Srinivasan | G06F 3/0611 |
| 7,730,474 B2 * | 6/2010 | Izuta | G06F 9/4401 717/168 |
| 2005/0210188 A1 * | 9/2005 | Mizuno | G06F 3/0605 711/112 |
| 2007/0016901 A1 * | 1/2007 | Izuta | G06F 9/4401 717/168 |
| 2013/0091328 A1 * | 4/2013 | Yoshihara | G06F 12/0817 711/118 |
| 2015/0106578 A1 * | 4/2015 | Warfield | G06F 3/0613 711/158 |

* cited by examiner

*Primary Examiner* — Charles Rones
*Assistant Examiner* — Matthew Chrzanowski
(74) *Attorney, Agent, or Firm* — Proskauer Rose LLP

(57) ABSTRACT

A method for upgrading storage processors in a storage system includes a first storage processor performing IO requests on a first one or more logical units, and a second storage processor performing IO requests on a second one or more logical units of the plurality of logical units. The method includes causing the first storage processor to stop performing the IO requests on the first one or more logical units and the second storage processor to perform the IO requests on the first one or more logical units. The method includes causing the second storage processor to stop performing the IO requests on the first one or more logical units of the plurality of logical units and a third storage processor to perform the IO requests on the first one or more logical units.

20 Claims, 12 Drawing Sheets

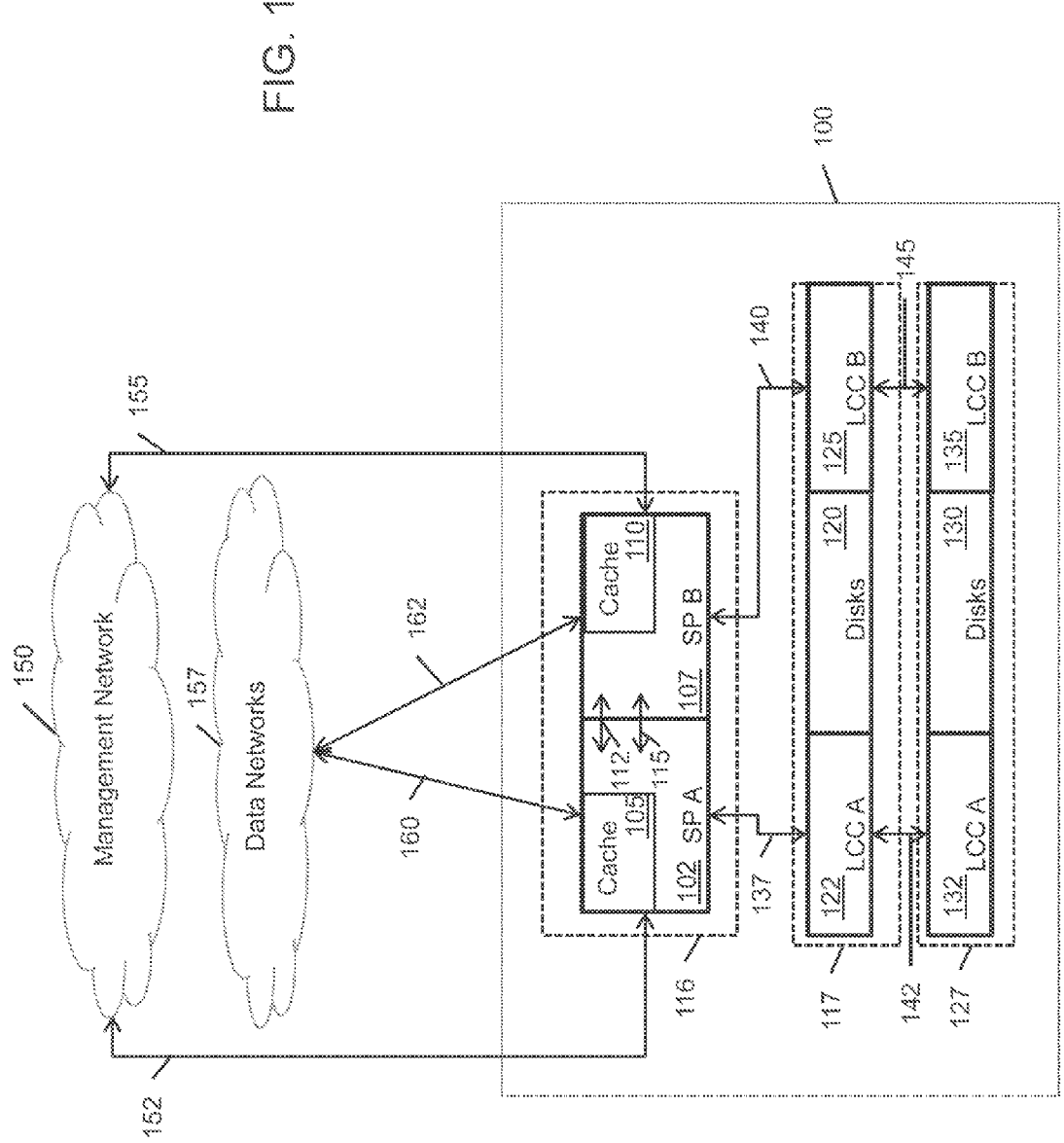

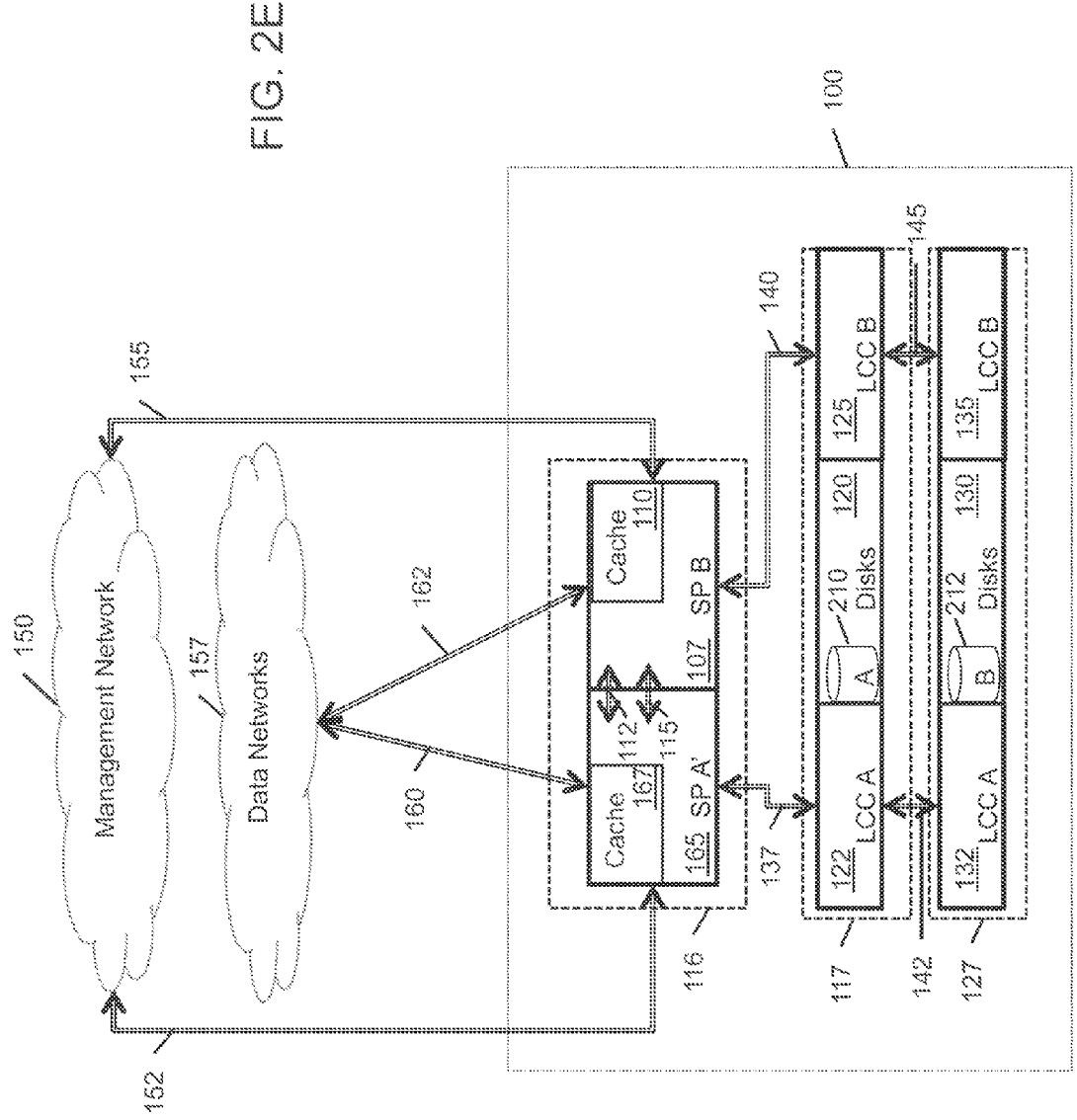

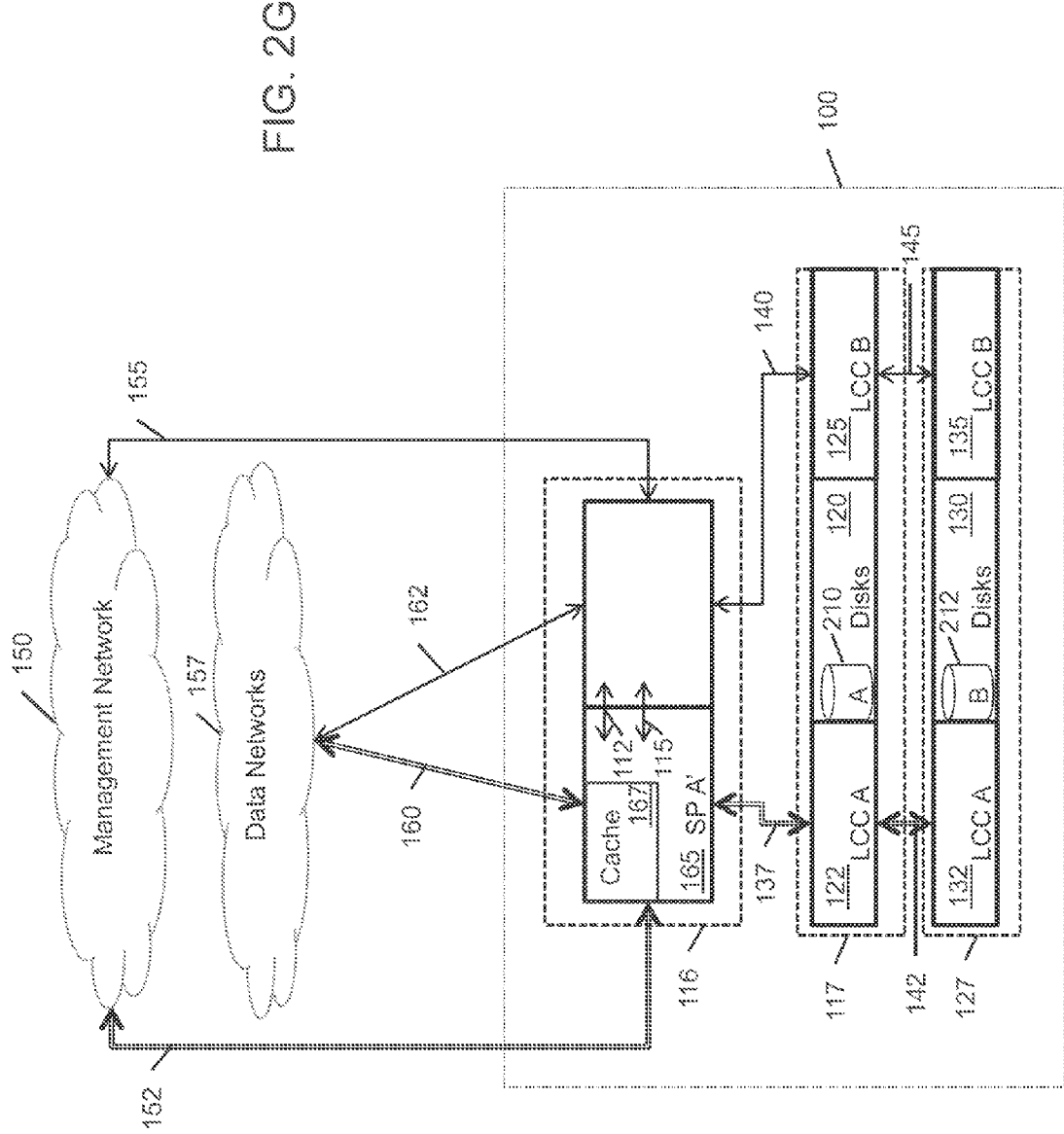

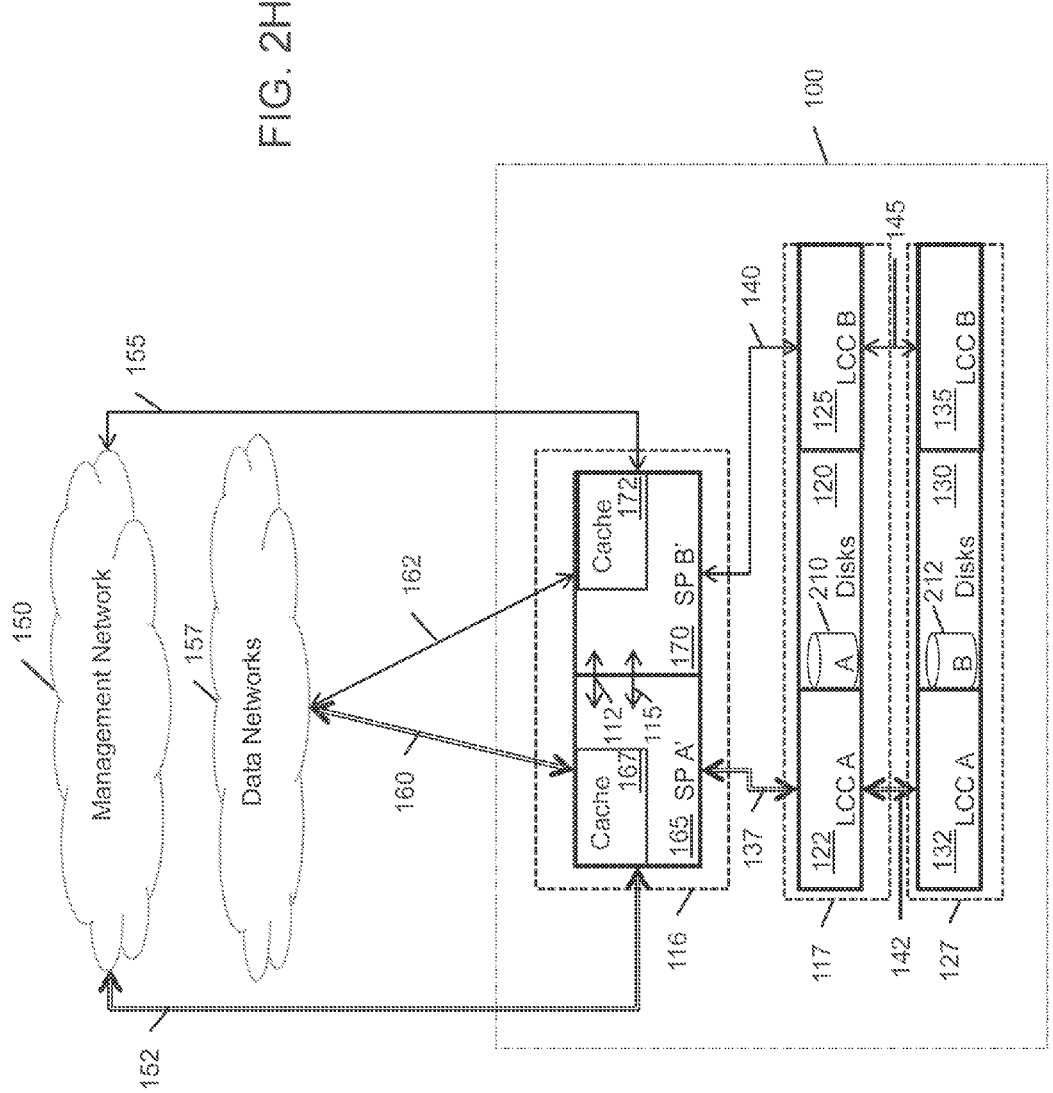

STORAGE PROCESSOR HARDWARE UPGRADE IN A STORAGE SYSTEM

FIELD OF THE TECHNOLOGY

The present technology relates generally to storage systems including storage processors and, more specifically, to storage systems and methods for upgrading storage processor hardware.

BACKGROUND

Data storage systems can fall into a plurality of categories, such as Network Attached Storage (NAS) and Storage Area Networks (SAN). A NAS system can be a stand-alone, network-accessible, storage device that can provide file-level access to electronic data. A SAN array can be a dedicated storage system that can connect numerous storage resources to one or many hosts. A SAN can provide block-level access to electronic data through one or more protocols, e.g., (SCSI-based protocols such as Fiber Channel or iSCSI), which can be used by a connected host to provide a file system.

Storage systems can be employed that include two storage processors and one or more storage devices. Examples of such storage devices include disk storage arrays and network storage arrays. From the perspective of a host that issues IO requests to the storage processors to read, write, copy, and/or allocate data storage on the storage devices, the storage devices appear accessible from either storage processor. In some storage systems, in order to upgrade the storage system both storage processors are replaced (e.g., with storage processors with increased memory and/or increased processing power). In some storage systems, in order to perform the upgrade both storage processors are shut down at the same time and replaced. When both storage systems are shut down, the storage system cannot process IO requests from hosts.

SUMMARY

Making a storage system unavailable to process IO requests from hosts during storage processor upgrade can be disruptive to hosts that interact with the storage system. For example, the host cannot access its data stored on the storage system. Therefore there is a need for storage systems in which storage processors can be upgraded while the storage system continues to process IO requests.

In one aspect, there is a method for upgrading storage processors in a storage system including a storage processor enclosure including a first storage processor including a first cache, and a second storage processor including a second cache, the second storage processor connected to the first storage processor by a first cache mirroring connection; and a disk enclosure including a plurality of disk units forming a plurality of logical units, wherein the disk enclosure is connected to the first storage processor and the second storage processor. The method includes performing, by the first storage processor, IO requests on a first one or more logical units of the plurality of logical units. The method includes performing, by the second storage processor, IO requests on a second one or more logical units of the plurality of logical units. The method includes mirroring, by the first storage processor and the second storage processor, the first cache and the second cache via the first cache mirroring connection. The method includes causing, by the storage system, the first storage processor to stop performing the IO requests on the first one or more logical units of the plurality of logical units and the second storage processor to perform the IO requests on the first one or more logical units of the plurality of logical units. The method includes replacing, in the storage processor enclosure, the first storage processor with a third storage processor including a third cache. The method includes causing, by the storage system, the second storage processor to stop performing the IO requests on the first one or more logical units of the plurality of logical units and the third storage processor to perform the IO requests on the first one or more logical units of the plurality of logical units. The method includes mirroring, by the second storage processor and the third storage processor, the second cache and the third cache via the first cache mirroring connection. The method includes causing, by the storage system, the second storage processor to stop performing the IO requests on the second one or more logical units of the plurality of logical units and the third storage processor to perform the IO requests on the second one or more logical units of the plurality of logical units. The method includes replacing, in the storage processor enclosure, the second storage processor with a fourth storage processor including a fourth cache. The method includes causing, by the storage system, the third storage processor to stop performing the IO requests on the second one or more logical units of the plurality of logical units and the fourth storage processor to perform the IO requests on the second one or more logical units of the plurality of logical units. The method includes mirroring, by the third storage processor and the fourth storage processor, the third cache and the fourth cache via the first cache mirroring connection.

In some embodiments, causing the second storage processor to stop performing the IO requests on the first one or more logical units of the plurality of logical units and the third storage processor to perform the IO requests on the first one or more logical units of the plurality of logical units includes copying the second cache to the third cache via the first cache mirroring connection. In some embodiments, causing the third storage processor to stop performing the IO requests on the second one or more logical units of the plurality of logical units and the fourth storage processor to perform the IO requests on the second one or more logical units of the plurality of logical units includes copying the third cache to the fourth cache via the first cache mirroring connection.

In some embodiments, the method can include synchronizing, by the second storage processor and the third storage processor, a size of the second cache and a size of the third cache. In some embodiments, the method can include providing, by the second storage processor, to the third storage processor a first memory size, wherein the first memory size indicates the size of the second cache. In some embodiments, the method can include providing, by the third storage processor, to the second storage processor a second memory size, wherein the second memory size indicates an amount of memory available for the third cache. In some embodiments, the method can include if the second memory size is greater than the first memory size, setting the size of the third cache to the first memory size.

In some embodiments, the method can include providing, by the second storage processor, to the third storage processor a first memory size, wherein the first memory size indicates an amount of memory available for the second cache. In some embodiments, the method can include providing, by the third storage processor, to the second storage processor a second memory size, wherein the second memory size indicates an amount of memory available for the third cache. In some embodiments, the method can include setting the size of the second cache and the third cache to the lesser of the first memory size and the second memory size.

In some embodiments, the method can include synchronizing, by the second storage processor and the third storage processor, a size of the second cache and a size of the third cache prior to the third storage processor performing the IO requests on the first one or more logical units of the plurality of logical units. In some embodiments, the method can include storing a current cache size value on at least one disk of the plurality of disks, wherein the current cache size value equals the size of the second cache and the size of the third cache. In some embodiments, the method can include sending, by the second storage processor, to the third storage processor first one or more memory addresses of the second cache. In some embodiments, the method can include sending, by the third storage processor, to the second storage processor second one or more memory addresses of the third cache. In some embodiments, the method can include sending, by the second storage processor, to the third storage processor, a first number of processor cores in the second storage processor. In some embodiments, the method can include sending, by the third storage processor, to the second storage processor, a second number of processor cores in the third storage processor. In some embodiments, the method can include sending, by an $n^{th}$ processor core of the second storage processor, to an $m^{th}$ processor core of the third storage processor, an inter-storage processor message, wherein m is given by n modulo the second number of processor cores.

In another aspect, there is method for upgrading storage processors in a storage system including a storage processor enclosure including a first storage processor including a first cache, and a second storage processor including a second cache, the second storage processor connected to the first storage processor by a first cache mirroring connection; and a disk enclosure including a plurality of disk units forming a plurality of logical units, wherein the disk enclosure is connected to the first storage processor and the second storage processor. The method includes servicing, by the first storage processor and the second storage processor, IO requests for the plurality of logical units. The method includes mirroring, by the first storage processor and the second storage processor, the first cache and the second cache via the first cache mirroring connection. The method includes replacing, in the storage processor enclosure, the first storage processor with a third storage processor including a third cache while the second storage processor services the IO requests for the plurality of logical units. The method includes servicing, by the second storage processor and the third storage processor, IO requests for the plurality of logical units. The method includes mirroring, by the second storage processor and the third storage processor, the second cache and the third cache via the first cache mirroring connection. The method includes replacing, in the storage processor enclosure, the second storage processor with a fourth storage processor including a fourth cache while the third storage processor services the IO requests for the plurality of logical units. The method includes servicing, by the third storage processor and the fourth storage processor, IO requests for the plurality of logical units. The method includes mirroring, by the third storage processor and the fourth storage processor, the third cache and the fourth cache via the first cache mirroring connection.

In some embodiments, the method includes synchronizing, by the second storage processor and the third storage processor, a size of the second cache and a size of the third cache. In some embodiments, the method includes synchronizing, by the second storage processor and the third storage processor, a size of the second cache and a size of the third cache prior to the third storage processor performing the IO requests on the first one or more logical units of the plurality of logical units.

In some embodiments, the method includes storing a current cache size value on at least one disk of the plurality of disks, wherein the current cache size value equals the size of the second cache and the size of the third cache. In some embodiments, the method includes sending, by the second storage processor, to the third storage processor, a first number of processor cores in the second storage processor. In some embodiments, the method includes sending, by the third storage processor, to the second storage processor, a second number of processor cores in the third storage processor. In some embodiments, the method includes sending, by an $n^{th}$ processor core of the second storage processor, to an $m^{th}$ processor core of the third storage processor, an inter-storage processor message, wherein m is given by n modulo the second number of processor cores.

In another aspect, there is a storage system. The storage system includes a storage processor enclosure including a first storage processor including a first cache, and a second storage processor including a second cache, the second storage processor connected to the first storage processor by a first cache mirroring connection. The storage system includes a disk enclosure including a plurality of disk units forming a plurality of logical units, wherein the disk enclosure is connected to the first storage processor and the second storage processor. The first storage processor and the second storage processor are configured to service IO requests for the plurality of logical units and mirror the first cache and the second cache via the first cache mirroring connection. The second storage processor is configured to service the IO requests for the plurality of logical units while the first storage processor is replaced with a third storage processor including a third cache. The second storage processor and the third storage processor are configured to service IO requests for the plurality of logical units and mirror the second cache and the third cache via the first cache mirroring connection. The third storage processor is configured to service the IO requests for the plurality of logical units while the second storage processor is replaced with a fourth storage processor including a fourth cache. The third storage processor and the fourth storage processor are configured to service IO requests for the plurality of logical units and mirror the third cache and the fourth cache via the first cache mirroring connection.

In some embodiments, the second storage processor and the third storage processor are further configured to synchronize a size of the second cache and a size of the third cache. In some embodiments, the second storage processor and the third storage processor are further configured to synchronize a size of the second cache and a size of the third cache prior to the third storage processor performing the IO requests on the first one or more logical units of the plurality of logical units.

In some embodiments, the storage system is further configured to store a current cache size value on at least one disk of the plurality of disks, wherein the current cache size value equals the size of the second cache and the size of the third cache. In some embodiments, the second storage processor is further configured to send to the third storage processor a first number of processor cores in the second storage processor; wherein the third storage processor is further configured to send to the second storage processor a second number of processor cores in the third storage processor; and wherein the second storage processor is further configured to send from an $n^{th}$ processor core of the second storage processor to an $m^{th}$ processor core of the third storage processor, an inter-storage processor message, wherein m is given by n modulo the second number of processor cores.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which:

FIG. 1 depicts a storage system, in accordance with the technology;

FIGS. 2A-2I depict a storage system during the upgrade of storage processors.

DETAILED DESCRIPTION

Figure 2A:
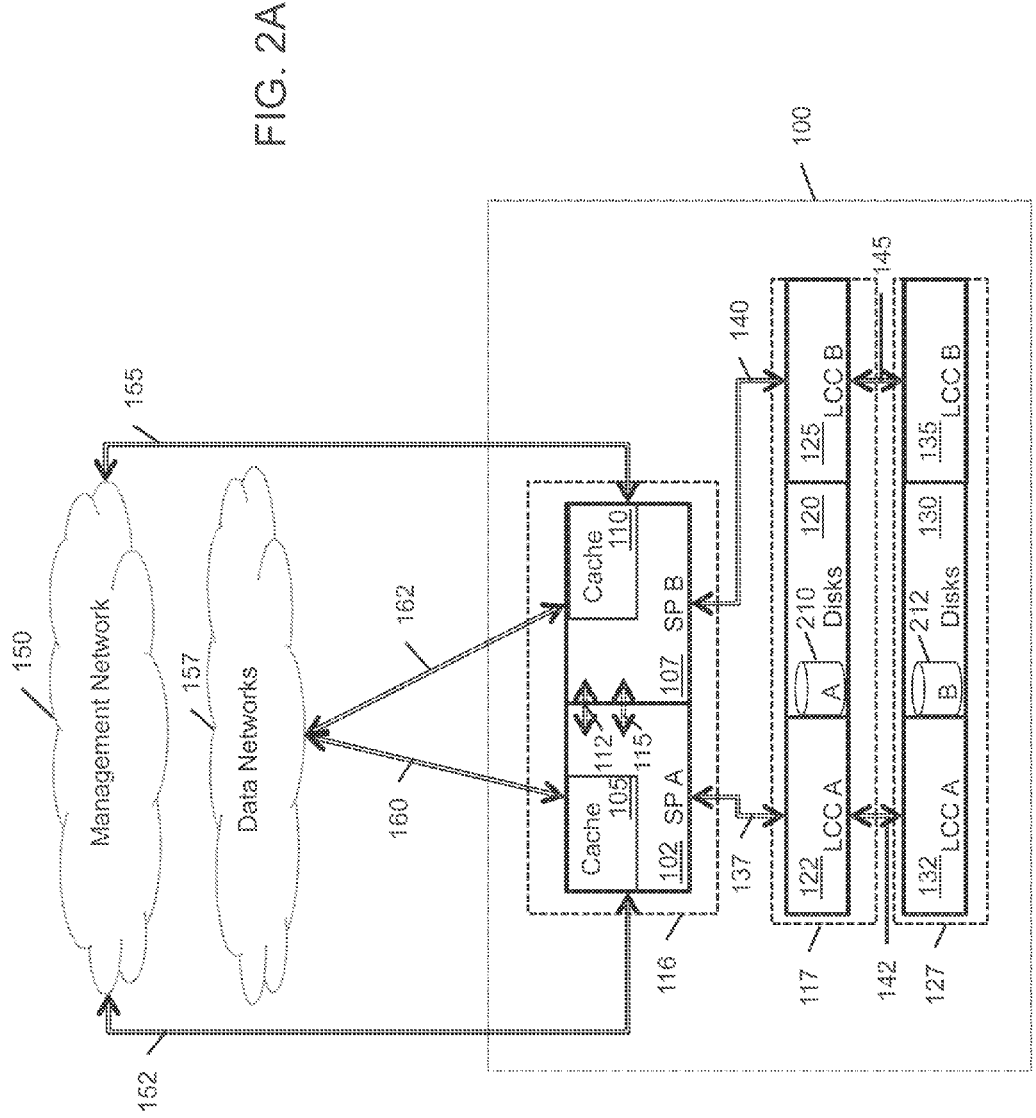

A storage system can utilize two active storage processors to service IO requests received from hosts. For example, each active storage processor can perform the necessary processing on storage devices to effectuate the received read, write, copy, etc. IO requests. In some storage systems, both active storage processors are shut down to upgrade the storage processors (e.g., as a part of upgrading the storage system and/or storage array to a new mode), making the storage system unavailable to process IO requests from hosts. In some applications, it is undesirable to make the storage system unavailable to process IO requests when upgrading the storage processors.

The technology described herein facilitates non-disruptively upgrading the storage processors in a storage system by permitting the storage system to continue processing IO requests while the storage processors are replaced. In some embodiments, the technology involves a storage system with two active storage processors connected to storage devices (e.g., each active storage processor can perform IO requests received from hosts for operations to be performed on the storage devices). In accordance with embodiments of the technology, while one of the storage processors is being replaced, the remaining active storage processor can take over performing the IO requests previously performed by the storage processor being replaced. Beneficially, this can allow the storage system to continue processing IO requests during the replacement. Once the replacement storage processor is running, it can process the IO requests previously handled by the replaced storage processor. For example, a storage system can be upgraded (e.g., by replacing the storage processors with newer hardware) without making the storage system unavailable for processing IO requests.

Exemplary Storage System Environments

FIG. 1 depicts storage system 100, in accordance with the technology. Storage system 100 includes storage processor (SP) A 102, which includes cache 105. Storage system 100 includes SP B 107, which includes cache 110. SP A 102 and SP B 107 can be any computing devices, such as servers, blade servers, etc. Cache 105 and cache 110 can be any memory. SP A 102 and SP B 107 are connected by service connection 112 and cache mirroring connection 115. Service connection 112 and cache mirroring connection 115 can each be any type of connection for communicating data between SP A 102 and SP B 107, such as an Ethernet connection, a PCI or PCI express connection, an infiniband connection, etc. In some embodiments, SP A 102 and SP B 107 are contained by storage processor enclosure 116. In some embodiments, service connection 112 and cache mirroring connection 115 can be located on a mid-plane or a back-plane in storage processor enclosure 116, into which SP A 102 and SP B 107 connect.

System 100 includes disk array enclosure 117 and disk array enclosure 127. Disk array enclosure 117 includes disks 120, link control card (LCC) A 122, and LCC B 125. Disk array enclosure 127 includes disks 130, LCC A 132, and LCC B 135. Disks 120 and 130 can be any form of storage, such as magnetic disk drives, flash memory drives, etc. In the illustrated embodiment, SP A 102 is connected to LCC A 122 of disk enclosure 117 by connection 137. SP B 107 is connected to LCC B 125 of disk enclosure 117 by connection 140. LCC A 122 of disk enclosure 117 is connected to LCC A 132 of disk enclosure 127 by connection 142. LCC B 125 of disk enclosure 117 is connected to LCC B 135 of disk enclosure 127 by connection 145. Connections 137, 140, 142, and 145 can be any data connection, such as, e.g., fibre channel. Storage system 100 can be connected to management network 150. As illustrated, storage processor A 102 and storage processor B 107 are connected to management network 150 by connection 152 and connection 155, respectively. Storage system 100 can be connected to data networks 157. As illustrated, storage processor A 102 and storage processor B 107 are connected to data networks by connection 160 and connection 162, respectively. Connections 152, 155, 160, and 162 can each be any type of connection for communicating data.

In some embodiments, storage system 100 can be modular to facilitate the replacement and/or upgrade of parts. For example storage processor enclosure 116 can include a midplane and/or backplane to which SP A 102 and SP B 107 are removably connected. Cables providing connections 137, 140, 152, 155, 160, and 162 can be connected to the midplane and/or backplane (or IO cards connected to the midplane and/or backplane). Beneficially, such a configuration can facilitate replacing SP A 102 and SP B 107 without requiring recabling connections 137, 140, 152, 155, 160, and 162.

It should be appreciated that storage system 100 in FIG. 1 is an exemplary storage system in accordance with the technology. Other configurations are contemplated. In some embodiments, the storage processors and disk enclosures can be in the same enclosure. In some embodiments, more than two storage processors can be in the same enclosure.

Storage Processor Upgrade

FIGS. 2A-2I depict storage system 100 during the upgrade of storage processors. As illustrated, storage system 100 includes LUN A 210 and LUN B 212. LUN A 210 is a logical storage volume consisting of portions of one or more of disks 120. LUN B 212 is a logical storage volume consisting of portions of one or more of disks 130. Storage system 100 can receive and process IO requests from hosts connected to data networks 157, where the IO requests indicate operations for (e.g., requests to read from or write to), e.g., LUN A 210 and LUN B 212.

With reference to FIGS. 2A-2I, connections depicted as heavy double-lines are in use or carrying data and connections depicted as light lines are physically present (e.g., cabled) but are not carrying data. FIG. 2A depicts storage system 100 when SP A 102 and SP B 107 are active. In general, SP A 102 and SP B 107 service IO requests received from data networks 157. When servicing the IO requests, caches 105 and 110 are mirrored (e.g., to ensure the data on storage system 100 appears identical to SP A 102 and SP B 107). SP A 102 and SP B 107 can also receive requests from management network 150 (e.g., to configure storage system 100 and/or provide information about the status of storage system 100).

In some embodiments, SP A 102 can effectuate IO requests on LUN A 210, and SP B 107 can effectuate IO requests on LUN B 212 (e.g., when SP A 102 owns LUN A 210, and SP B 107 owns LUN B 212). As an illustrative example, a host on data networks 157 can send a write IO request to write data to LUN B 212. If the host sends the write IO request to SP B 107, SP B 107 can perform the write request on LUN B 212. For example, SP B 107 can store the to-be-written data contained in the write IO request to cache 110 and/or write the to-be-written data to those of disks 130 making up LUN B 212. SP B 107 can update cache 105 on SP A 102 such that the contents of cache 105 and cache 110 both reflect that the write to LUN B 212 has occurred (e.g., via direct memory access over cache mirroring connection 115). SP B 107 can acknowledge to the sending host that the write IO request was performed. SP A 102 can receive IO requests for LUN B 212. If the host sends the write IO request to SP A 102 (e.g., via connection 160), SP A 102 will determine that SP B 107 performs IO requests on LUN B 212, and provide the write IO request to SP B 107. SP B 107 can effectuate the write IO request as described above and notify SP A 102 that the write IO request was performed. SP A 102 can acknowledge to the sending host that the write IO request was performed. IO requests for LUN A 210 can similarly be effectuated by SP A 102.

Figure 2B:
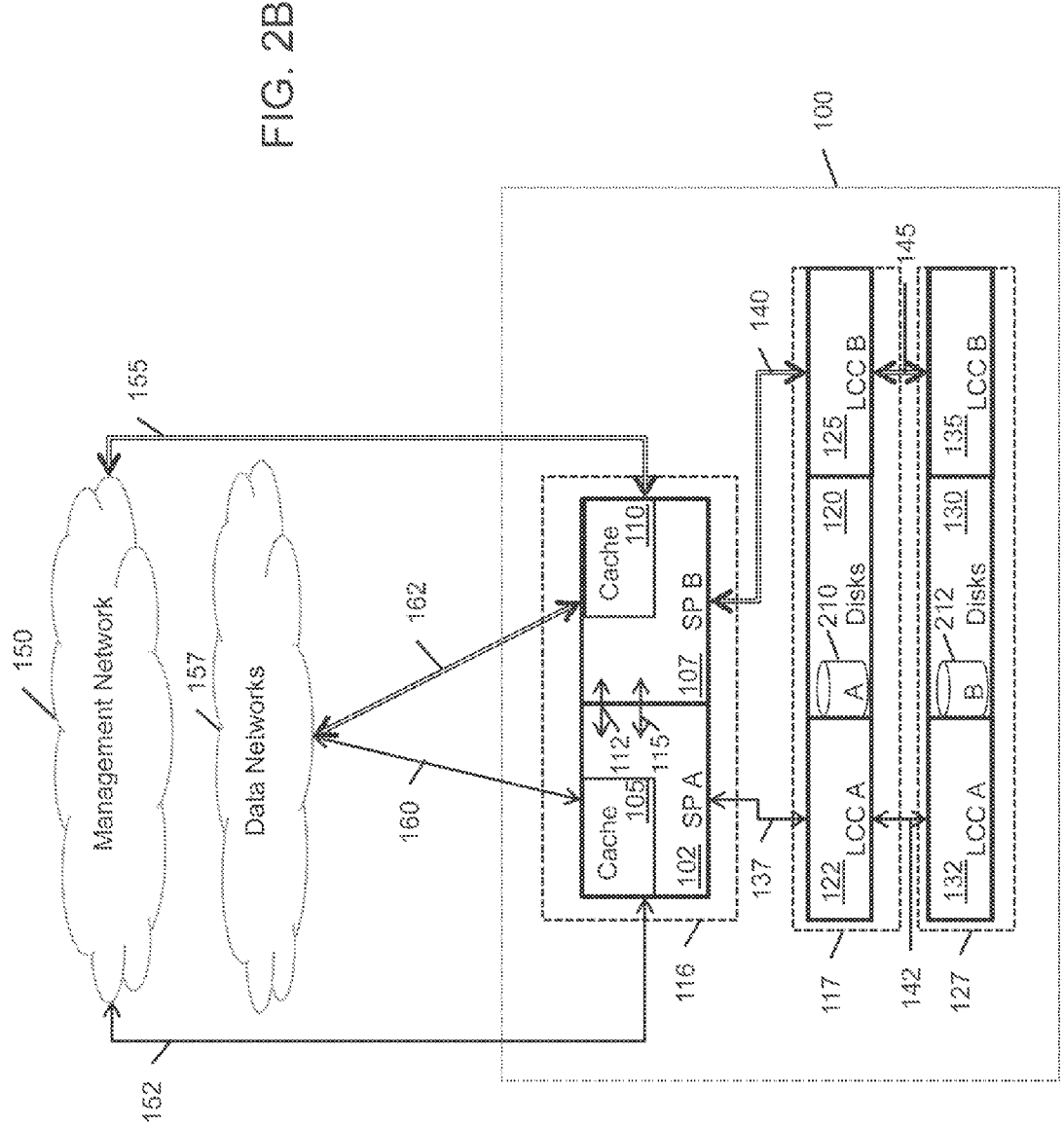
Figure 2C:
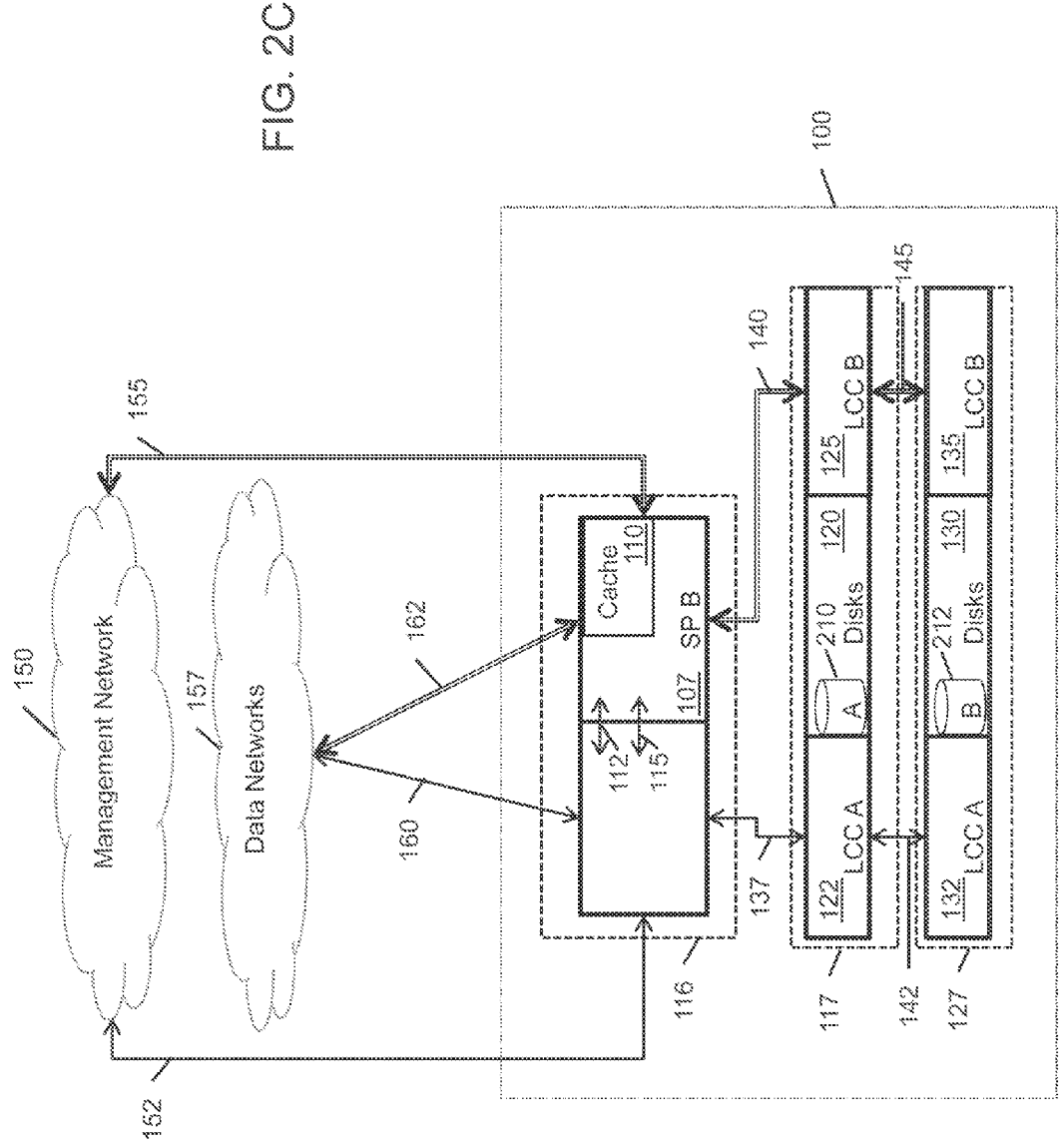
Figure 2D:
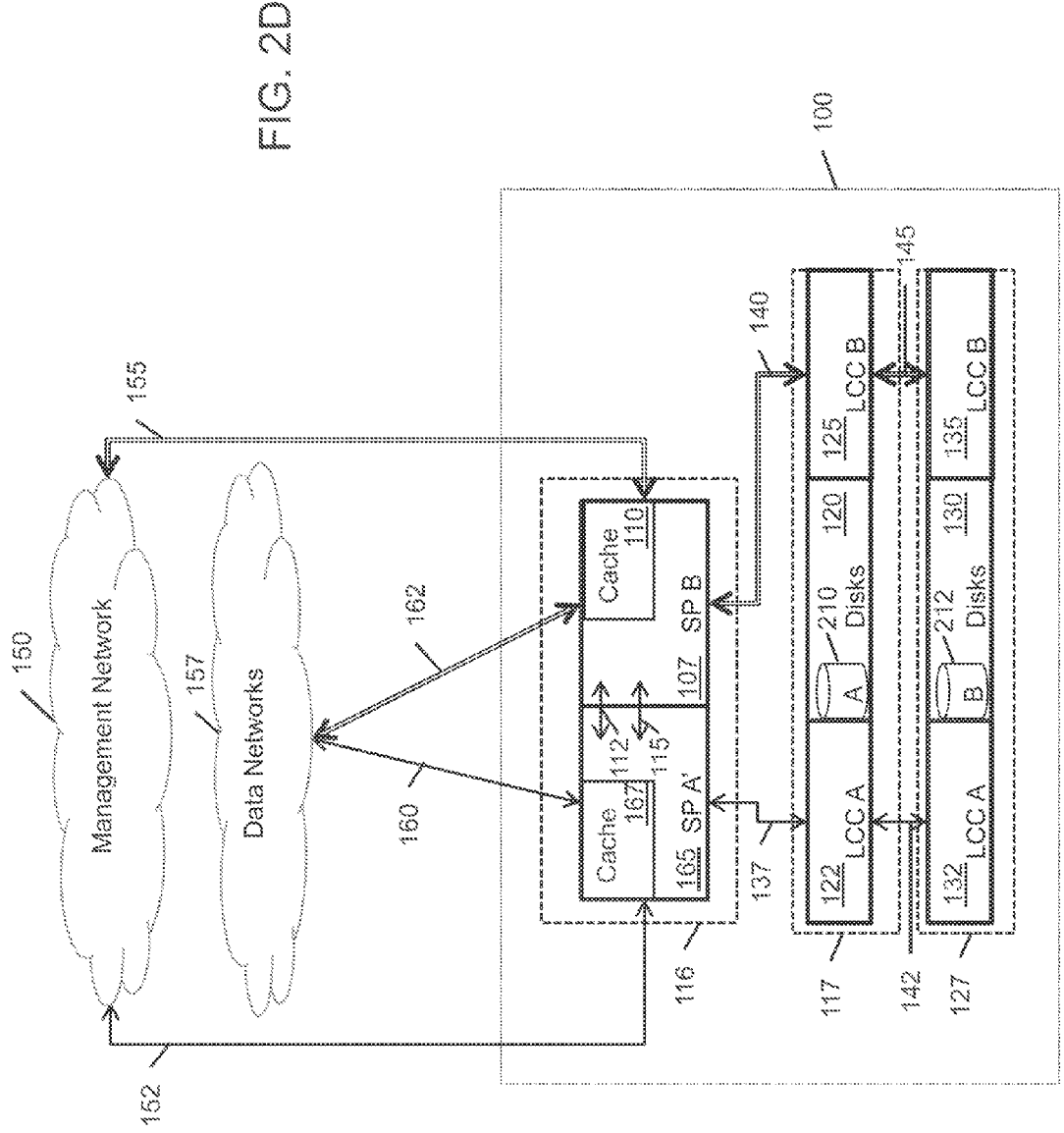

FIG. 2B depicts storage system 100 after SP A 102 has been shut down for upgrading. In connection with SP A 102 being shut down, SP B 107 takes over servicing IO requests for LUN A 210 (and continues to service IO requests for LUN B 212). FIG. 2C depicts storage system 100 after SP A 102 has been removed from storage processor enclosure 116. As illustrated, service connection 112, cache mirroring connection 115, and connections 137, 152, and 160 can remain when SP A 102 is removed. FIG. 2D depicts storage system 100 after SP A' 165 has been installed into storage processor enclosure 116, replacing SP A 102. In some embodiments, SP A' 165 can have more memory and/or processing capability than SP A 102. For example, installation into storage processor enclosure 116 can include connecting SP A' 165 to a mid-plane and/or backplane of storage processor enclosure 116.

SP A' 165 can be brought up to an operating state after being installed into storage processor enclosure 116. In some embodiments, the process of bringing up SP A' 165 can include synchronizing cache 110 of SP B 107 and cache 167 of SP A' 165. Synchronizing cache 110 of SP B 107 and cache 167 of SP A' 165 can facilitate mirroring cache 110 of SP B 107 and cache 167 of SP A' 165 when SP B 107 and SP A' 165 are both servicing IO requests. In some embodiments, SP B 107 and SP A' 165 can synchronize the size of cache 110 and the size of cache 167 such that the two are the same size. For example, SP B 107 can provide the size of cache 110 to SP A' 165, and SP A' 165 can provide the amount of memory available for cache 167 to SP B 107. If the amount of memory available for cache 167 is larger than the size of cache 110, the size of cache 167 can be set to be the same as cache 110. As another example, SP B 107 can provide the amount of memory available for cache 110 to SP A' 165, and SP A' 165 can provide the amount of memory available for cache 167 to SP B 107. The size of caches 110 and cache 167 can be set to the largest size both SP B 107 and SP A' 165 can accommodate (e.g., the lesser of the amount of memory available for cache 110 and the amount of memory available for cache 110 to SP A' 165). In some embodiments, the size of cache 110 of SP B 107 and cache 167 of SP A' 165 can be synchronized before SP A' 165 begins servicing IO requests.

In some embodiment, a current cache size value can be stored to one or more of disks 120 and/or disks 130. The current cache size can be the size of the caches in each storage processor after their cache sizes have been synchronized. In some embodiments, when each storage processor is brought up, it is configured to set the size of its cache to be no greater than current cache size value stored to one or more of disks 120 and/or disks 130. In some embodiments, the current cache size value can only be changed when both storage processors have been brought up and each can support a cache size of the new cache size value (e.g., each has sufficient memory). For example, when SP A' 165 is brought up to an operating state after being installed into storage processor enclosure 116, SP A' 165 can limit the size of cache 167 to be no greater than the current cache size value stored to one or more of disks 120 and/or disks 130. This can prevent SP A' 165 from setting the size of its cache to be larger than SP B 107 can support for cache 110.

Storing the current cache size to disk can prevent one of the storage processors (e.g., an upgraded storage processor) from setting the size of its cache to a size the other storage processor (e.g., a non-upgraded storage processor) cannot support. For example, after both storage processors are shut down, in some embodiments, the first storage processor brought up will set the size of its cache to be no greater than the current cache size value to ensure that each storage processor will have sufficient memory to mirror the other storage processor's cache.

In some embodiments, in the event of a power failure, storage system 100 can cause one of the storage processors (e.g., SP A' 165 or SP B 107) to store the data in its cache (e.g., cache 167 or cache 110) to one or more of disks 120 and/or disks 130. In some embodiments, the storage system includes a battery (or other backup power source) configured to provide power to storage system 100 while the cache data is stored to disks 120 and/or disks 130. Beneficially, by limiting both storage processors' cache size to the current cache size value, in some embodiments, a storage processor will not write more cache data to disks 120 and/or disks 130 than the other storage processor can support. In some embodiments, two storage processors can store the data in each storage processor's cache to one or more of disks 120 and/or disks 130, thereby providing redundant copies of the cache data.

In some embodiments, synchronizing cache 110 and cache 167 can include providing memory addresses for the respective caches. For example, SP B 107 can provide one or more memory addresses for cache 110 to SP A' 165. SP A' 167 can provide one or more memory addresses for cache 167 to SP B 107. In some embodiments, the memory addresses can be used to update cache 110 or cache 167. For example, when SP B 107 updates cache 110 (e.g., in the course of servicing a write IO request), SP B 107 can use a memory address of cache 167 to update cache 167 (e.g., SP B can write to cache 167 via direct memory access). In some embodiments, the process of bringing up SP A' 165 can include copying cache 110 to cache 167.

In some embodiments, the process of bringing up SP A' 165 can include SP B 107 and SP A' 165 providing the number of processor cores each contains. For example, SP B 107 can provide the number of processor cores it contains to SP A' 165, and SP A' 165 can provide the number of processor cores it contains to SP B 107. In some embodiments, the number of processors in each of SP B 107 and SP A' 165 can be used in routing inter-storage processor message between SP B 107 and SP A' 165. For example, an inter-storage processor message from the nth processor core on SP B 107 can be sent to an m$^{th}$ processor core on SP A' 165 via cache mirroring connection 115, where m is given by the following equation:

$$m = n \bmod \text{NumProcs}_{SP\,A'}$$

where NumProcs$_{SP\,A'}$ is the number of processor cores in SP A' 165.

FIG. 2E depicts storage system 100 after SP A' 165 has begun servicing IO. As illustrated, SP A' 165 has taken over processing IO requests for LUN A 210. Cache 105 and cache 167 can be mirrored via cache mirroring connection 115.

Figure 2F:
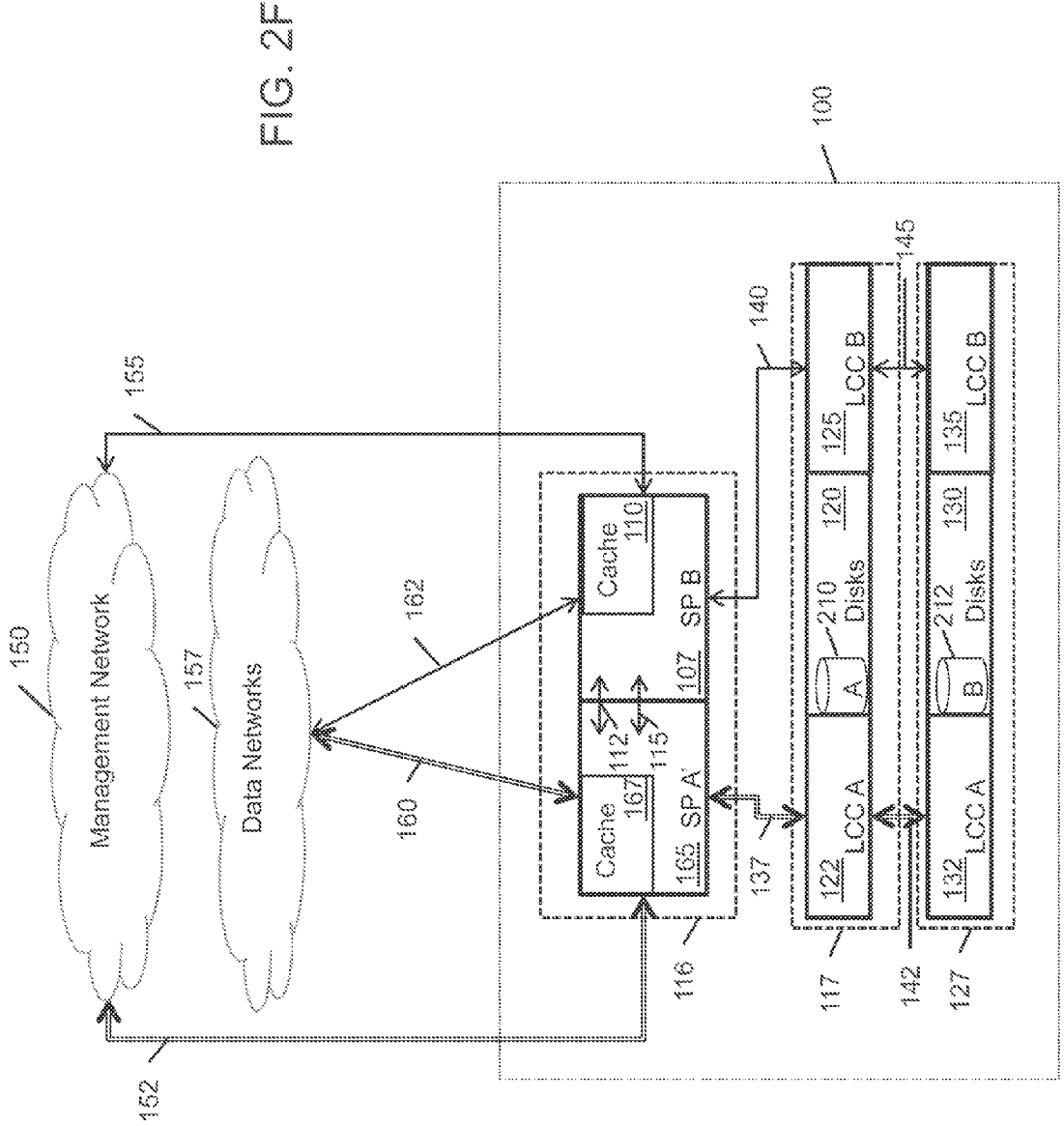
Figure 21:
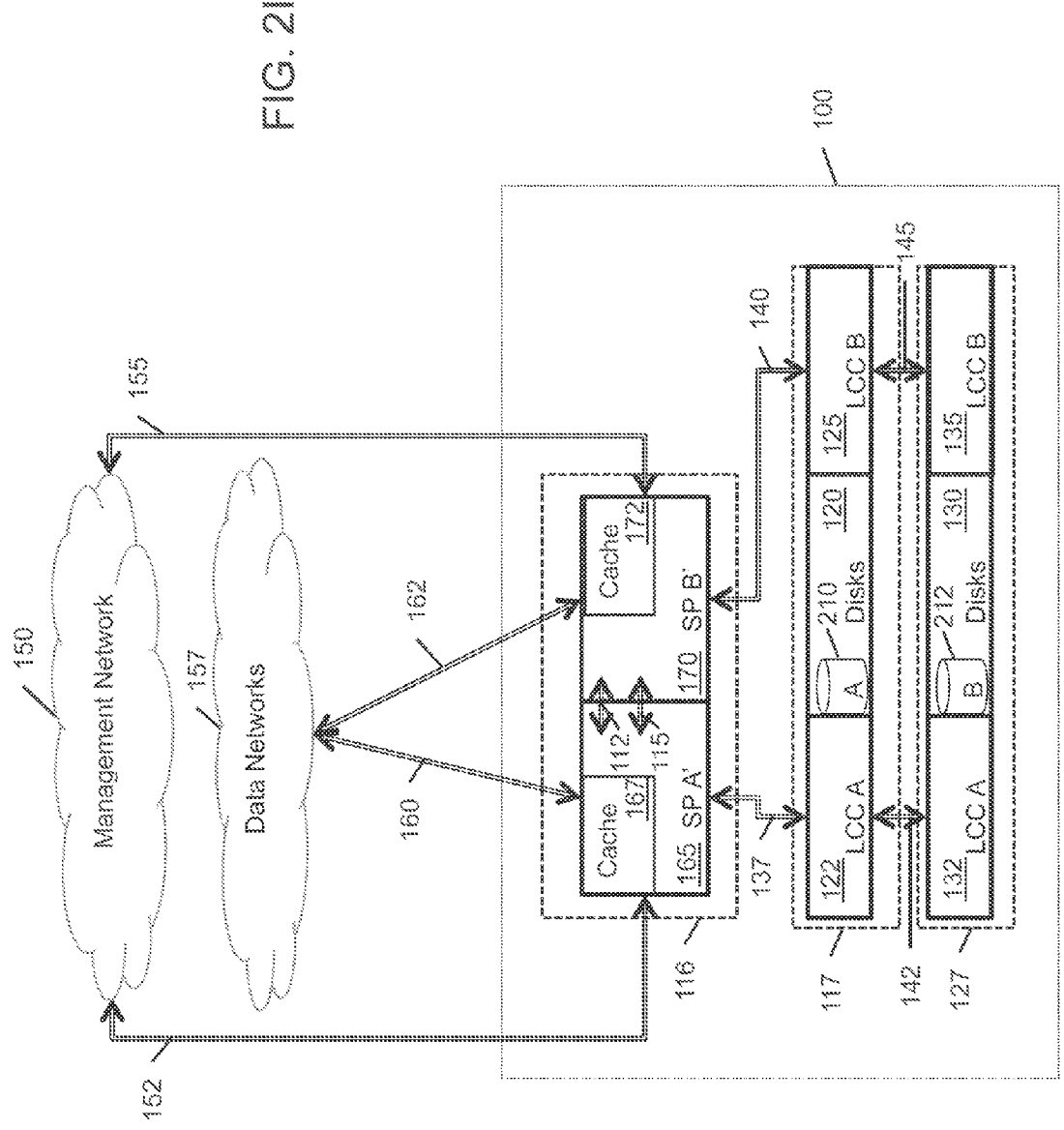

FIG. 2F depicts storage system 100 after SP B 107 has been shut down for upgrade. In connection with SP B 107 being shut down, SP A' 165 takes over servicing IO requests for LUN B 212 (and continues to service IO requests for LUN A 210). FIG. 2G depicts storage system 100 after SP B 107 has been removed from storage processor enclosure 116. As illustrated, service connection 112, cache mirroring connection 115, and connections 140, 155, and 162 can remain when SP B 107 is removed. FIG. 2H depicts storage system 100 after SP B' 170 has been installed into storage processor enclosure 116, replacing SP B 107. For example, installation into storage processor enclosure 116 can include connecting SP B' 170 to a mid-plane and/or backplane of storage processor enclosure 116. SP B' 170 can be brought up to an operating state after being installed into storage processor enclosure 116 in a manner similar to that described above with respect to SP A' 165.

FIG. 2I depicts storage system 100 after SP B' 170 has begun servicing IO. As illustrated, SP B' 165 has taken over processing IO requests for LUN B 212. Cache 167 and cache 172 can be mirrored via cache mirroring connection 115.

As noted above, FIGS. 2A-2I depict storage system 100 during the upgrade of storage processors. In some embodiments, as a result of the upgrading the storage processors, the storage system can make available upgraded features and/or functionality. For example, after both upgraded storage processors are brought up, the size of the caches can be increased due to the increased amount of memory in the upgraded storage processors. As another example, the upgraded storage processors can facilitate greater storage capacity and/or capability by the storage system (e.g., the storage system can support an increased number of LUNs, an increased number of file systems, an increased number of disks, etc.). As another example, the upgraded storage processors can support increased connectivity for the storage system (e.g., the storage system can support an increased number of hosts and/or connections to hosts).

In some embodiments, upgrading the storage processors can include a commit process which occurs before the upgraded features (e.g., increasing the size of the cache used by the storage processors or any of those features described above) become active. In some embodiments, the commit process can happen automatically when both storage processors have been upgraded (e.g., replaced with new storage processor hardware) and brought up. In some embodiments, user input can be required to complete the commit process (e.g., after the user has confirmed the upgraded storage processors are functional). In some embodiments, a user can be required to install a new license to complete the commit process.

Figure 3A:
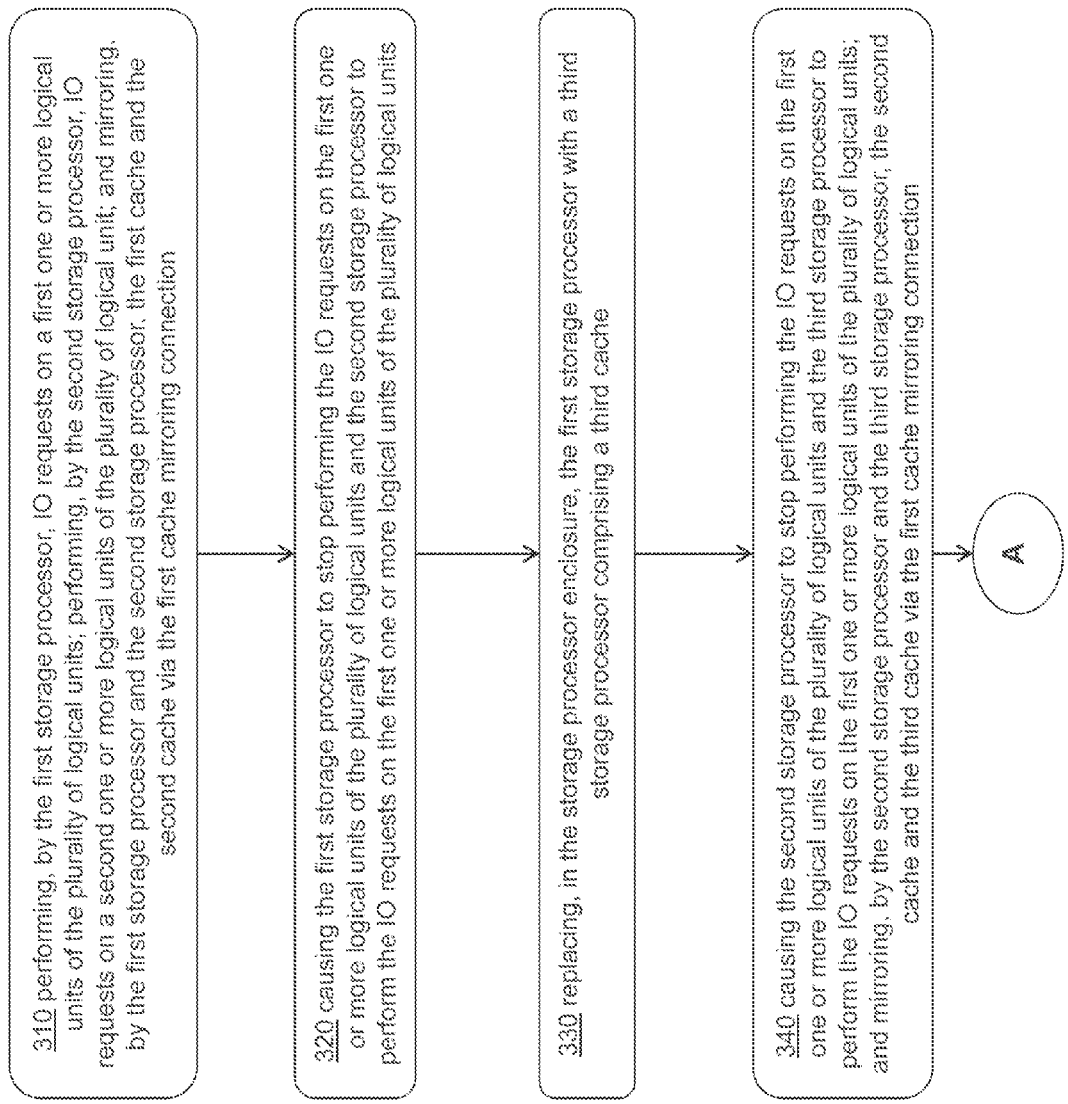
FIGS. 3A-3B are a flowchart depicting a method of upgrading storage processors in accordance with the technology.
Figure 3B:
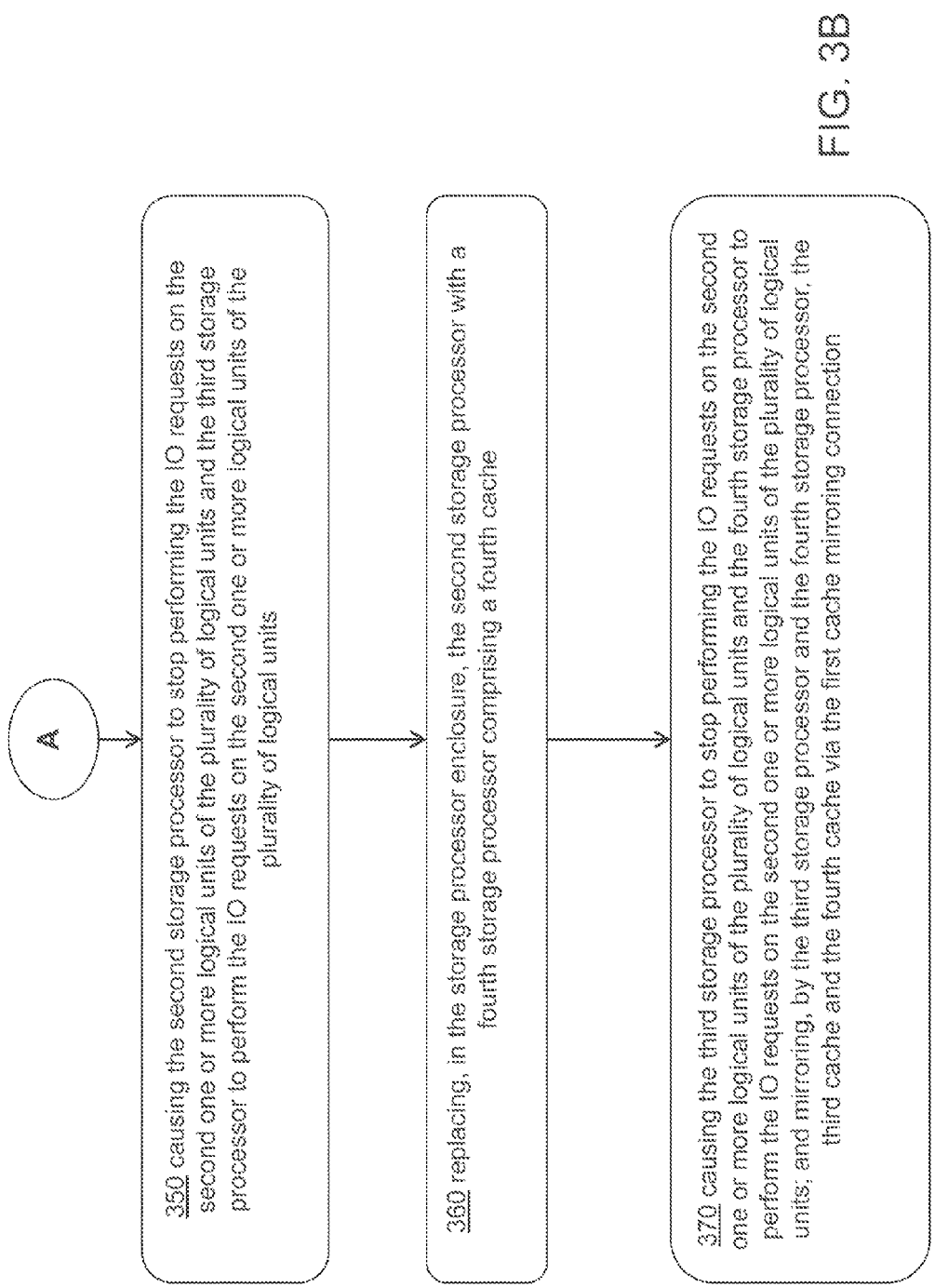

FIGS. 3A-3B are a flowchart depicting a method of upgrading storage processors in accordance with the technology. At step 310, the first storage processor performs IO requests on a first one or more logical units and the second storage processor performs IO requests on a second one or more logical units. The first cache and the second cache are mirrored. For example, as illustrated with respect to FIG. 2A, SP A 102 can perform IO requests on LUN A 210 and SP B 107 can perform IO requests on LUN B 212. Cache 105 and cache 110 can be mirrored. At step 320, the storage system causes the first storage processor to stop performing the IO requests on the first one or more logical units of the plurality of logical units and the second storage processor to perform the IO requests on the first one or more logical units of the plurality of logical units. For example, as illustrated with respect to FIG. 2B, SP A 102 can be shut down and SP B 107 can take over servicing IO requests for LUN A 210 and continue to service IO requests for LUN B 212. At step 330, the first storage processor is replaced with a third storage processor comprising a third cache. For example, as illustrated with respect to FIG. 2C and FIG. 2D, SP A 102 can be removed from storage processor enclosure 116 and SP A' 165 can be installed into storage processor enclosure 116, replacing SP A 102. At step 340, the storage system causes the second storage processor to stop performing the IO requests on the first one or more logical units of the plurality of logical units and the third storage processor to perform the IO requests on the first one or more logical units of the plurality of logical units. The second cache and the third cache are mirrored. For example, as illustrated with respect to FIG. 2E, SP A' 165 can service IO requests. As illustrated, SP A' 165 can process IO requests for LUN A 210. Cache 110 and cache 167 can be mirrored via cache mirroring connection 115.

At step 350, the storage system causes the second storage processor to stop performing the IO requests on the second one or more logical units of the plurality of logical units and the third storage processor to perform the IO requests on the second one or more logical units of the plurality of logical units. For example, as illustrated with respect to FIG. 2F, SP A' 165 can take over servicing IO requests for LUN B 212 (and continues to service IO requests for LUN A 210). At step 360, the second storage processor is replaced with a fourth storage processor comprising a fourth cache. For example, as illustrated with respect to FIG. 2G and FIG. 2H, SP B 107 can be removed from storage processor enclosure 116 and SP B' 170 can be installed into storage processor enclosure 116, replacing SP B 107. At step 370, the storage system causes the third storage processor to stop performing the IO requests on the second one or more logical units of the plurality of logical units and the fourth storage processor to perform the IO requests on the second one or more logical units of the plurality of logical units. The third cache and the fourth cache are mirrored. For example, as illustrated with respect to FIG. 2I, SP B' 170 can service IO requests. As illustrated, SP B' 170 can process IO requests for LUN B 212. Cache 167 and cache 172 can be mirrored via cache mirroring connection 115.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method for upgrading storage processors in a storage system comprising a storage processor enclosure comprising a first storage processor comprising a first cache, and a second storage processor comprising a second cache, the second storage processor connected to the first storage processor by a first cache mirroring connection; and a disk enclosure comprising a plurality of disk units forming a plurality of logical units, wherein the disk enclosure is connected to the first storage processor and the second storage processor, the method comprising:
   performing, by the first storage processor, IO requests on a first one or more logical units of the plurality of logical units;
   performing, by the second storage processor, IO requests on a second one or more logical units of the plurality of logical units;
   mirroring, by the first storage processor and the second storage processor, the first cache and the second cache via the first cache mirroring connection;
   causing, by the storage system, the first storage processor to stop performing the IO requests on the first one or more logical units of the plurality of logical units and the second storage processor to perform the IO requests on the first one or more logical units of the plurality of logical units;
   replacing, in the storage processor enclosure, the first storage processor with a third storage processor comprising a third cache;
   causing, by the storage system, the second storage processor to stop performing the IO requests on the first one or more logical units of the plurality of logical units and the third storage processor to perform the IO requests on the first one or more logical units of the plurality of logical units;
   mirroring, by the second storage processor and the third storage processor, the second cache and the third cache via the first cache mirroring connection;
   causing, by the storage system, the second storage processor to stop performing the IO requests on the second one or more logical units of the plurality of logical units and the third storage processor to perform the IO requests on the second one or more logical units of the plurality of logical units;
   replacing, in the storage processor enclosure, the second storage processor with a fourth storage processor comprising a fourth cache;
   causing, by the storage system, the third storage processor to stop performing the IO requests on the second one or more logical units of the plurality of logical units and the fourth storage processor to perform the IO requests on the second one or more logical units of the plurality of logical units; and
   mirroring, by the third storage processor and the fourth storage processor, the third cache and the fourth cache via the first cache mirroring connection.

2. The method of claim 1, wherein causing the second storage processor to stop performing the IO requests on the first one or more logical units of the plurality of logical units and the third storage processor to perform the IO requests on the first one or more logical units of the plurality of logical units comprises copying the second cache to the third cache via the first cache mirroring connection.

3. The method of claim 1, wherein causing the third storage processor to stop performing the IO requests on the second one or more logical units of the plurality of logical units and the fourth storage processor to perform the IO requests on the second one or more logical units of the plurality of logical units comprises copying the third cache to the fourth cache via the first cache mirroring connection.

4. The method of claim 1, further comprising synchronizing, by the second storage processor and the third storage processor, a size of the second cache and a size of the third cache.

5. The method of claim 4, further comprising:
providing, by the second storage processor, to the third storage processor a first memory size, wherein the first memory size indicates the size of the second cache;
providing, by the third storage processor, to the second storage processor a second memory size, wherein the second memory size indicates an amount of memory available for the third cache; and
if the second memory size is greater than the first memory size, setting the size of the third cache to the first memory size.

6. The method of claim 4, further comprising:
providing, by the second storage processor, to the third storage processor a first memory size, wherein the first memory size indicates an amount of memory available for the second cache;
providing, by the third storage processor, to the second storage processor a second memory size, wherein the second memory size indicates an amount of memory available for the third cache; and
setting the size of the second cache and the third cache to the lesser of the first memory size and the second memory size.

7. The method of claim 4, further comprising synchronizing, by the second storage processor and the third storage processor, a size of the second cache and a size of the third cache prior to the third storage processor performing the IO requests on the first one or more logical units of the plurality of logical units.

8. The method of claim 4, further comprising storing a current cache size value on at least one disk of the plurality of disks, wherein the current cache size value equals the size of the second cache and the size of the third cache.

9. The method of claim 1, further comprising:
sending, by the second storage processor, to the third storage processor first one or more memory addresses of the second cache;
sending, by the third storage processor, to the second storage processor second one or more memory addresses of the third cache.

10. The method of claim 1, further comprising:
sending, by the second storage processor, to the third storage processor, a first number of processor cores in the second storage processor;
sending, by the third storage processor, to the second storage processor, a second number of processor cores in the third storage processor;
sending, by an $n^{th}$ processor core of the second storage processor, to an $m^{th}$ processor core of the third storage processor, an inter-storage processor message, wherein m is given by n modulo the second number of processor cores.

11. A method for upgrading storage processors in a storage system comprising a storage processor enclosure comprising a first storage processor comprising a first cache, and a second storage processor comprising a second cache, the second storage processor connected to the first storage processor by a first cache mirroring connection; and a disk enclosure comprising a plurality of disk units forming a plurality of logical units, wherein the disk enclosure is connected to the first storage processor and the second storage processor, the method comprising:
servicing, by the first storage processor and the second storage processor, IO requests for the plurality of logical units;
mirroring, by the first storage processor and the second storage processor, the first cache and the second cache via the first cache mirroring connection;
replacing, in the storage processor enclosure, the first storage processor with a third storage processor comprising a third cache while the second storage processor services the IO requests for the plurality of logical units;
servicing, by the second storage processor and the third storage processor, IO requests for the plurality of logical units;
mirroring, by the second storage processor and the third storage processor, the second cache and the third cache via the first cache mirroring connection;
replacing, in the storage processor enclosure, the second storage processor with a fourth storage processor comprising a fourth cache while the third storage processor services the IO requests for the plurality of logical units;
servicing, by the third storage processor and the fourth storage processor, IO requests for the plurality of logical units; and
mirroring, by the third storage processor and the fourth storage processor, the third cache and the fourth cache via the first cache mirroring connection.

12. The method of claim 11, further comprising synchronizing, by the second storage processor and the third storage processor, a size of the second cache and a size of the third cache.

13. The method of claim 12, further comprising synchronizing, by the second storage processor and the third storage processor, a size of the second cache and a size of the third cache prior to the third storage processor performing the IO requests on the first one or more logical units of the plurality of logical units.

14. The method of claim 12, further comprising storing a current cache size value on at least one disk of the plurality of disks, wherein the current cache size value equals the size of the second cache and the size of the third cache.

15. The method of claim 11, further comprising:
sending, by the second storage processor, to the third storage processor, a first number of processor cores in the second storage processor;
sending, by the third storage processor, to the second storage processor, a second number of processor cores in the third storage processor;
sending, by an $n^{th}$ processor core of the second storage processor, to an $m^{th}$ processor core of the third storage processor, an inter-storage processor message, wherein m is given by n modulo the second number of processor cores.

16. A storage system comprising:
a storage processor enclosure comprising:
a first storage processor comprising a first cache, and
a second storage processor comprising a second cache, the second storage processor connected to the first storage processor by a first cache mirroring connection; and
a disk enclosure comprising a plurality of disk units forming a plurality of logical units, wherein the disk enclosure is connected to the first storage processor and the second storage processor;
wherein the first storage processor and the second storage processor are configured to service IO requests for the plurality of logical units and mirror the first cache and the second cache via the first cache mirroring connection;
wherein the second storage processor is configured to service the IO requests for the plurality of logical units while the first storage processor is replaced with a third storage processor comprising a third cache;

wherein the second storage processor and the third storage processor are configured to service IO requests for the plurality of logical units and mirror the second cache and the third cache via the first cache mirroring connection;

wherein the third storage processor is configured to service the IO requests for the plurality of logical units while the second storage processor is replaced with a fourth storage processor comprising a fourth cache; and wherein the third storage processor and the fourth storage processor are configured to service IO requests for the plurality of logical units and mirror the third cache and the fourth cache via the first cache mirroring connection.

17. The storage system of claim 16, wherein the second storage processor and the third storage processor are further configured to synchronize a size of the second cache and a size of the third cache.

18. The storage system of claim 17, wherein the second storage processor and the third storage processor are further configured to synchronize a size of the second cache and a size of the third cache prior to the third storage processor performing the IO requests on the first one or more logical units of the plurality of logical units.

19. The storage system of claim 17, wherein the storage system is further configured to store a current cache size value on at least one disk of the plurality of disks, wherein the current cache size value equals the size of the second cache and the size of the third cache.

20. The storage system of claim 16, wherein the second storage processor is further configured to send to the third storage processor a first number of processor cores in the second storage processor; wherein the third storage processor is further configured to send to the second storage processor a second number of processor cores in the third storage processor; and wherein the second storage processor is further configured to send from an $n^{th}$ processor core of the second storage processor to an $m^{th}$ processor core of the third storage processor, an inter-storage processor message, wherein m is given by n modulo the second number of processor cores.

* * * * *